Sept. 12, 1944. R. S. HEYM 2,358,163
APPARATUS FOR AUTOMATICALLY INDICATING THE
ELECTRICAL CONDUCTIVITY OF LIQUIDS
Filed July 10, 1941
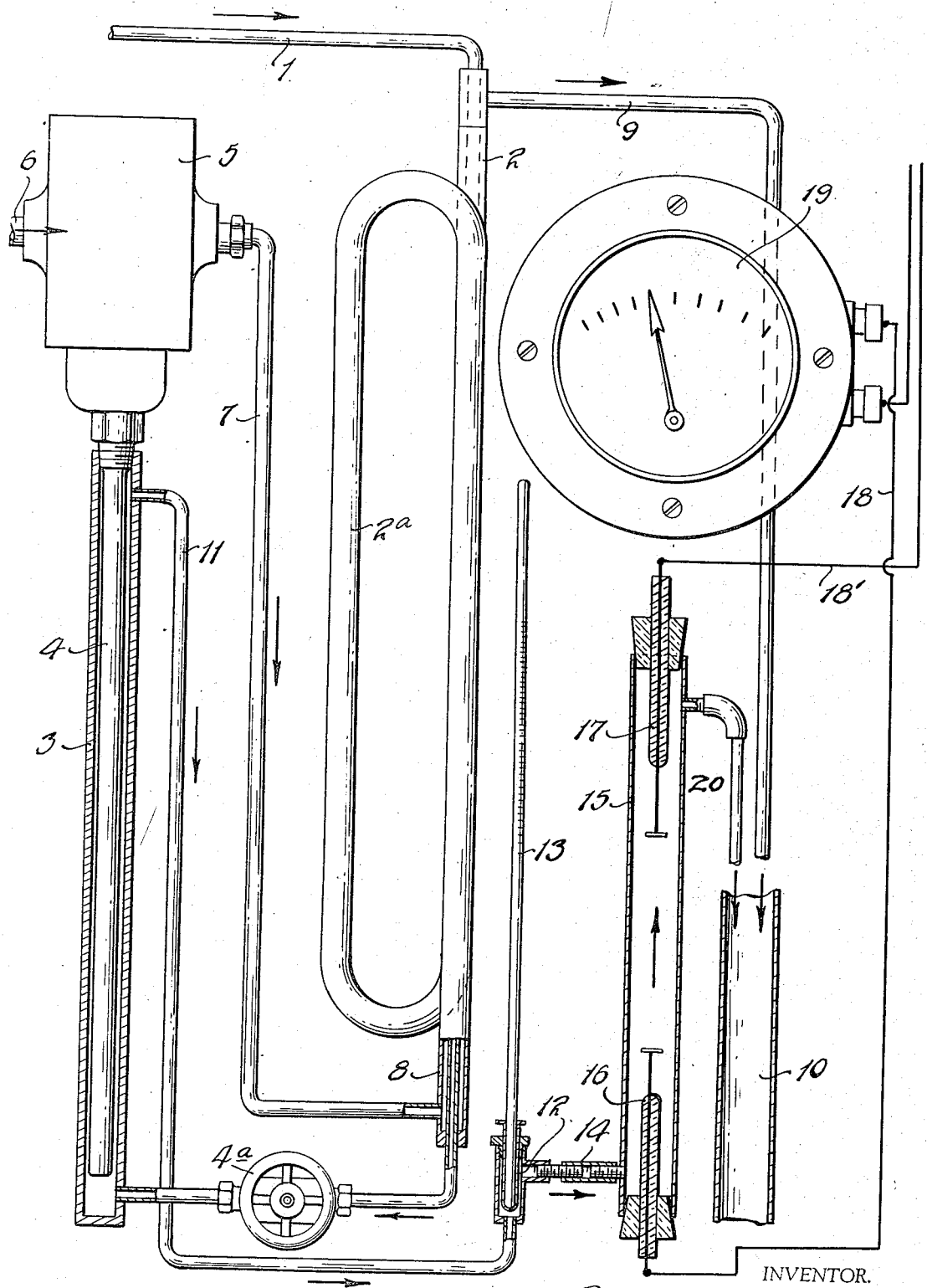
INVENTOR.
RAYMOND S. HEYM.
BY Charles E. Brown
ATTORNEY.

Patented Sept. 12, 1944

2,358,163

UNITED STATES PATENT OFFICE 2,358,163

APPARATUS FOR AUTOMATICALLY INDICATING THE ELECTRICAL CONDUCTIVITY OF LIQUIDS

Raymond S. Heym, Birmingham, Mich.

Application July 10, 1941, Serial No. 401,806

1 Claim. (Cl. 257—2)

This invention relates to apparatus for indicating the electrical conductivity of solutions, aqueous or otherwise, of salts, acids, and bases or combinations thereof under substantially constant temperature conditions.

The electrical conductivity of a solution is a function of the nature of the electrolyte, the solvent, the concentration and the temperature. The electrical conductivity (also known as Specific Conductance) varies directly with concentration up to a maximum point, after which there is a decrease. Where the nature of the electrolyte and the solvent is definitely established, the concentration is constant, the electrical conductivity will then vary only with temperature. Thus, if temperature of a solution (where the nature of the electrolyte and solvent is definitely established) is held substantially constant, then the electrical conductivity of the solution affords a method of determining the concentration of the solution.

The objects and novel features of the invention are involved in the means for continuously passing a quantity of solution through an electrical conductivity cell associated with which is a means for maintaining the temperature of the solution passing through the cell substantially constant as the electrical conductivity varies with temperature and thus, in order that the electrical conductivity may be an accurate bases of determining concentration, the temperature of the solution must remain substantially constant.

It is also a feature of the invention to associate therewith a conductivity meter or means for determining the electrical conductivity, and a thermometer providing a constant visible indication of the temperature of the solution flowing to the conductivity cell.

These and other objects and novel features of the invention are hereinafter more fully described and claimed and the preferred character and arrangement of parts of an apparatus embodying my invention is shown in the accompanying drawing which is diagrammatic in character, its purpose being to provide a means whereby the dissolved solid concentration of boiler water, boiler feed water, steam condensate, or other fluids may be determined.

If the concentration of dissolved solids, or boiler water (as an example), becomes too high considerable amounts of boiler water are carried over with the steam, and the solids contained in the boiler water result in depositions of solids in steam lines, valves, steam traps, superheaters, turbines blades etc. In order to reduce the concentration of dissolved solids in the boiler water it is the practice to remove some of the boiler water by intermittent or continuous blowdowns, and to admit relatively dilute feed water in its place. It is thus obvious that if no control is exercised in "blowing down" a boiler, a large heat loss will result as well as a wastage of treated water.

The apparatus as arranged for the testing of boiler water is preferably mounted adjacent a boiler (not here shown) and a conduit 1 is provided through which the heated boiler water passes to a heat exchanger which may be of any approved form. In the form shown in the drawing, the conduit 1 passes through a vertical pipe 2 in spaced relation therewith, the two conduits being formed in an elongated coil preferably of single turn providing a heat exchanger 2a.

The conduit 1 extends outwardly at the bottom of the outer conduit forming the heat exchanger and opens to the interior of an outer tube 3 at the bottom, a control valve 4a being provided in the pipe 1 between the bottom end of the heat exchanger and the lower end of the tube 3. Within this tube 3 is a thermal bulb 4 and to the top of which is secured a casing 5 containing a water regulating valve from which leads a pipe 6 for supplying cooling water under pressure which, as hereinafter described, varies the volume of cooling water flowing through the conduit 7 per unit of time and discharges to the lower end of the heat exchanger as indicated at 8. The cooling water thence passes through the pipe 9 to a drain pipe 10. The thermal bulb and water regulating valve actuated thereby is a well-known means for varying flow of liquid through variation in temperature.

By this arrangement, it will be realized that the heated boiler water or other fluid containing dissolved solids flowing through the pipe 1 is cooled or condensed by the cooling water flowing through the pipe 7 and in view of the fluid being tested varying in temperature the thermal bulb 4 will correspondingly and automatically vary the volume of flow of cooling water per unit of time to the heat exchanger and thus a constant temperature of the water or other aqueous fluid being tested is obtained.

The water passing through the pipe 1 into the tube 3 having the bulb 4 therein passes through a pipe 11 to a fitting 12 in which there is a thermal well containing the bulb of a thermometer 13, the reading of which would be affected by variation in temperature of the fluid. The fluid passing through the pipe 11 to the thermal cell thence passes through a coupling 14 to the lower end of an electrical conductivity cell 15 having the opposed electrodes 16 and 17 therein and from the top of the cell is a drip pipe 20 for discharge of water from the conductivity cell to the drain pipe 10.

Associated with the electrodes is an electric circuit consisting of wires 18 and 18' connected to the current supply lines and to the opposed electrodes 16 and 17 and to an electrical conductivity meter 19 which is calibrated to indicate the conductivity units ($mhos/cm.^3 \times 10^{-6}$) and gives a constant indication of the electrical conductivity of the boiler water.

The important features of the invention reside in the provision of an apparatus in which there is a flow of boiler water or condensed aqueous or other fluid at substantially constant temperature through the apparatus. As the temperature of the boiler water or condensed liquid varies, its electrical conductivity varies and in order that an accurate indication may be had of the solids content thereof, means is provided for maintaining the fluid passing to the electrical conductivity cell at a substantially constant temperature and this is accomplished by varying the flow of cooling water in accordance with the variation in the temperature of the fluid being tested to maintain the flow thereof through the electrical conductivity cell at substantially constant temperature.

It is obvious from the foregoing that the apparatus is of simple and inexpensive form, provides a means for giving an attendant a constant and visible indication of both the temperature of the fluid and the electrical conductivity thereof passing to the cell and if the temperature is too high or too low the valve 4a may be opened or closed to such degree as to increase or decrease the volume of cooling water passing through the heat exchanger per unit of time. With such apparatus variation in the electrical conductivity of the liquid due to variation in solids content will be indicated by the conductivity meter 19. It is also to be understood that various changes may be made in the relative position, arrangement, or form of parts and other changes made without departing from the spirit and scope of the invention as set forth in the appended claim.

Having thus fully described my invention, its utility and mode of operation, what I claim an desire to secure by Letters Patent of the United States is:

In apparatus for determining the ionizable material content of heated boiler water or other liquid variable in temperature, a conduit providing for flow of heated water from the boiler, a second conduit for supply of a cooling medium, a heat exchanger through which the heated boiler water passes and to which the cooling medium is supplied by the second conduit to vary the temperature of the heated boiler water flowing through the heat exchanger, a source of supply of cooling medium, a regulating valve for varying the flow of the cooling medium per unit of time through the heat exchanger, a temperature responsive means for controlling the regulating valve, said means being subject to the temperature of the heated boiler water passing thereto from the heat exchanger, a manually operable valve for varying the volume of flow per unit of time of the water tempered by the heat exchanger to said temperature responsive means for controlling the regulating valve, and means visibly indicating the temperature of the water subsequent to actuation of the regulating valve.

RAYMOND S. HEYM.